United States Patent
Eichler et al.

(10) Patent No.: US 9,708,478 B2
(45) Date of Patent: Jul. 18, 2017

(54) SEALING COMPOUNDS WITH BARRIER PROPERTIES

(71) Applicant: ACTEGA DS GMBH, Bremen (DE)

(72) Inventors: Waldemar Eichler, Bremen (DE); Rüdiger Wittenberg, Lilienthal (DE)

(73) Assignee: ACTEGA DS GMBH, Bremen (DE)

(*) Notice: Subject to any disclaimer, the term of this patent is extended or adjusted under 35 U.S.C. 154(b) by 0 days.

(21) Appl. No.: 14/990,849

(22) Filed: Jan. 8, 2016

(65) Prior Publication Data

US 2016/0152808 A1 Jun. 2, 2016

Related U.S. Application Data

(63) Continuation-in-part of application No. PCT/EP2013/065436, filed on Jul. 22, 2013.

(51) Int. Cl.
*B65D 53/06* (2006.01)
*C08L 23/06* (2006.01)

(52) U.S. Cl.
CPC .............. *C08L 23/06* (2013.01); *B65D 53/06* (2013.01); *C08L 2201/08* (2013.01); *C08L 2201/14* (2013.01); *C08L 2201/22* (2013.01); *C08L 2203/10* (2013.01); *C08L 2205/025* (2013.01); *C08L 2205/03* (2013.01); *C08L 2205/035* (2013.01); *C08L 2207/062* (2013.01); *C08L 2207/066* (2013.01)

(58) Field of Classification Search
None
See application file for complete search history.

(56) References Cited

U.S. PATENT DOCUMENTS

| | | | | |
|---|---|---|---|---|
| 5,731,053 A | * | 3/1998 | Kuhn | B65D 53/06 215/341 |
| 2006/0199911 A1 | * | 9/2006 | Markovich | C08L 23/0815 525/192 |
| 2013/0026127 A1 | * | 1/2013 | Mangel | C08L 23/06 215/233 |
| 2013/0041087 A1 | * | 2/2013 | Coulter | C08L 23/04 524/418 |

FOREIGN PATENT DOCUMENTS

| | | | | |
|---|---|---|---|---|
| DE | EP 0503124 A1 | * | 9/1992 | ......... B65D 51/1661 |
| DE | WO 2011069520 A1 | * | 6/2011 | ............. C08L 23/04 |
| EP | 0328337 A1 | * | 8/1989 | .......... B65D 81/266 |
| EP | 1 845 027 | | 10/2007 | |
| ES | EP 1845027 A1 | * | 10/2007 | ............... C08L 9/06 |
| WO | 2011/069520 | | 6/2011 | |

OTHER PUBLICATIONS

Shore Hardness Testing of Plastics, Matweb, downloaded Aug. 21, 2016, 3 pages.*
International Preliminary Report on Patentability and Written Opinion of the International Searching Authority dated Jan. 26, 2016, which issued during prosecution of International Application No. PCT/EP2013/065436.
International Search Report dated Jan. 23, 2014, which issued during prosecution of International Application No. PCT/EP2013/065436.
Australian Examination Report dated Apr. 21, 2017, which issued during prosecution of Australian Application No. 2013395216.

* cited by examiner

*Primary Examiner* — Peter A Salamon
(74) *Attorney, Agent, or Firm* — Vedder Price P.C.; Thomas J. Kowalski; Deborah L. Lu

(57) ABSTRACT

The invention relates to a polymer compound for a PVC-free sealing system for container closures, which is equipped with at least one oxygen-consuming compound, in which the Shore D hardness of the polymer compound is at least 20 and the polymer compound has a melt flow index (190° C., 5 kg) of at least 5.

31 Claims, No Drawings

SEALING COMPOUNDS WITH BARRIER PROPERTIES

RELATED APPLICATIONS AND INCORPORATION BY REFERENCE

This application is a continuation-in-part application of international patent application Serial No. PCT/EP2013/065436 filed Jul. 2, 2013, which published as PCT Publication No. WO 2015/010718 on Jan. 29, 2015.

The foregoing applications, and all documents cited therein or during their prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FIELD OF THE INVENTION

The invention relates to PVC-free polymer compounds that optimize the protection of beverages from oxygen by the combination of a passive oxygen barrier technology and oxygen-binding compounds (scavengers) within sealants for closures.

BACKGROUND OF THE INVENTION

Oxygen-sensitive beverages and foods have a great economic importance worldwide. In particular beer, wine, fruit juices and tea-based beverages have to be mentioned. The packaging industry has developed a range of technologies in order to keep these filling materials unchanged in terms of taste and composition for as long as possible.

For example, in the case of bottles made of PET and similar plastics mono- or multi-layer composites have been used, which are intended to reduce the oxygen permeation. In these cases special polyamide or ethylene vinyl alcohol polymers (EVOH) are usual polymers. As an alternative having a passive barrier extremely thin coatings of carbon or silicon oxides can be applied in the bottle's interior. U.S. Pat. No. 8,377,530 B2 also describes the use of low molecular weight additives from the class of aromatic amides.

Glass bottles having a metal closure are preferably provided with barrier technologies, as described in EP-0503124 A1. Apart from this also oxygen-depleting compounds are used as described in EP 0328337 B1. Both technologies are used for sealants of crown corks, but have so far been limited to the use in so-called "pry-off" crown corks.

It is advantageous to use such compounds for seals of container closures which do not comprise PVC components, neither in the form of PVC nor in the form of plasticized PVC. In the conventional incineration of household waste acidic gases arise from halogen plastics whose escape into the atmosphere is harmful. In addition, even small amounts of PVC impede the mechanical recycling of plastic waste. Moreover, soft PVC-based sealing elements require the use of plasticizers, which are also of concern for health reasons.

There is therefore a demand for container closures which have a polymer based sealing insert, and preferably contain an oxygen-depleting component or oxygen-consuming component, which, however, are not based on PVC.

Hereinafter a polymer compound, or simply called a compound, as usual in the industry, is understood to be a blend of one or more polymers with other components (e.g., viscosity adjuster, extenders, fillers, pigments, antioxidants, lubricants) which are used to adjust the desired application properties. These application properties relate to the behavior of the compound from its preparation to the use in the production of container closures (e.g. when placing it in a closure blank to produce a sealing insert) as well as to the properties of the closure in filling and storage of the container and at its intended use (e.g. opening, removal of the beverage or foodstuff, re-closure of the container) by the consumer.

It is already known from WO 2011/069520 to employ a PVC-free polymer compound to which an oxygen-depleting component (also called a "scavenger") has been added especially for twist crown caps. Preferably, these components are sulfite particles having a particular average particle size. By the sulfite a reduction of the oxygen ingress is achieved while the compound itself (that is, disregarding its scavenger content) need actually not have any certain barrier functions.

The compounds referred to in WO 2011/069520 are based on polypropylene and polyethylene, esp. LDPE and LLDPE, with contents of SEBS. SEBS has no useful barrier properties. These compounds contain substantial amounts of oil. In the embodiment white oil in an amount of 34% is the largest single component. The oil content is necessary in order to obtain the required physical parameters of the compounds.

For many applications, however, any oil content in a container sealing is undesirable. Oil can facilitate the migration of substances into and through the container sealing, which reduces the barrier properties of the seal. The resulting greater ingress of oxygen and other volatiles can affect the product properties.

In order to suppress such effects WO 2011/060803 proposed, for example, oil-free compounds especially when using fatty contents. However, barrier properties, optionally improved by scavenger substances, do not play a role.

Citation or identification of any document in this application is not an admission that such document is available as prior art to the present invention.

SUMMARY OF THE INVENTION

An essential function of the compounds discussed here is the generation of sealing inserts in container closures. This will not only prevent the leakage of the contents, but also protect them from pollution caused by substances, to which the filled and closed container can be exposed, for example, during storage and transport. In addition, for screw caps additives have to be used, which allow an easy removal of the contents and an easy resealing.

Thus, a container seal is inter alia intended to prevent that oxygen reaches the filling. Another important function is to limit the unwanted ingress of volatile compounds which may originate for example from the outer packaging, such as shrink wrap, cardboard or wooden pallets. In particular it is important that bottled beverages (beer, juices, mineral water) are sealed with bottle caps so that the ingress of TCA (trichloroanisole) and other volatile organic carbon compounds (VOC's) is suppressed.

In conventional container sealings the ingress of such substances (oxygen, TCA and the like) into the sealed container occurs, because the seal cannot prevent it. The pollutants migrate (e.g. due to their solubility in the compound) through the seal into the container and thus reach the filling.

Also undesirable is the opposite effect, namely that components of the filling penetrate the seal. This can be a problem e.g. with oily filling materials or flavored drinks.

In the prior art, the industry has limited itself to use compounds that either show (without the addition of scavengers) a barrier effect (i.e. which conceptually is intended to prevent the ingress of pollutants into the seal), or have a scavenger additive (which conceptually does not prevent the ingress of pollutants, but is intended to render them harmless within the sealing material). However, no sealing inserts are used so far which connect the barrier concept with the scavenger concept—probably because hitherto both concepts have been considered as alternatives that exclude each other.

Thus the invention may comprise in a particularly preferred embodiment compounds that advantageously combine the barrier concept with the scavenger concept. By combining the passive oxygen barrier technology with the oxygen-binding compounds (scavenger) in the sealing material, the protection of beverages from oxygen can be optimized.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. §112, first paragraph) or the EPO (Article 83 of the EPC), such that Applicants reserve the right and hereby disclose a disclaimer of any previously described product, process of making the product, or method of using the product. It may be advantageous in the practice of the invention to be in compliance with Art. 53(c) EPC and Rule 28(b) and (c) EPC. All rights to explicitly disclaim any embodiments that are the subject of any granted patent(s) of applicant in the lineage of this application or in any other lineage or in any prior filed application of any third party is explicitly reserved Nothing herein is to be construed as a promise.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

DETAILED DESCRIPTION OF THE INVENTION

The invention may comprise in a particularly preferred embodiment compounds that advantageously combine the barrier concept with the scavenger concept. By combining the passive oxygen barrier technology with the oxygen-binding compounds (scavenger) in the sealing material, the protection of beverages from oxygen can be optimized.

Thus, unexpected benefits arise.

On the one hand compounds may be developed, making it possible to realize gaskets in an extended range of hardness. Conventional barrier compounds in container closures are relatively hard (i.e., the Shore A—or Shore D—hardness is relatively high). More freedom of design may be advantageous here.

Secondly, it has been found that the compounds used according to the invention in the presence of the barrier scavenger particles have a higher capacity to absorb water, which in turn leads to an enhanced activation of the scavenger particles. There is an unexpected synergistic effect which optionally enables a reduction of the effective amount of scavenger particles, which in turn leads not only to reduced cost, but also to easier and more flexible processing.

The compounds of the invention can be used for all kinds of bottle closures, e.g. crown corks, aluminum closures and caps (such as plastic caps with an internal thread). For twist crown corks, they are less well suited because of their relatively greater hardness.

The polymer compounds of the invention may comprise in preferred embodiments, a scavenger component that in particular suppresses an access or inflow of oxygen.

As a scavenger inorganic sulfite e.g. sodium sulfite is particularly suitable. Other known scavengers such as ascorbic acid may be used as well. Suitable scavenger materials are described for example in terms of type, quantity and application in our application WO 2011/069520, which is incorporated by reference.

The invention further relates to certain polymer compounds of the aforementioned type, which allow for an improved barrier action even without the addition of a scavenger material.

Some of these barrier-compounds are based on mixtures of hard polyolefins, especially, HDPE or PP or co-PP, with butyl rubber, without the addition of other polymers, which reduce the hardness of the compounds. In embodiment 1, such a compound is described in which additionally a content of scavenger is provided.

Such compounds are relatively hard. They are particularly useful if the seal made therefrom is used only once, for example in "pry-off" bottle caps. However, for reusable and re-closable containers, and with uneven and rough edges to the container mouth, gaskets would be advantageous which are softer and more flexible.

For such purposes, compounds are better suited, which contain softening polymers. Such compounds are disclosed in embodiments 2, 3 and 4, apart from scavenger content specified therein.

These compounds exhibit an excellent barrier effect even with repeated use of the container closure and for uneven, rough and damaged container mouths.

Therefore it is an object of the invention to provide a sealing insert being suitable for the production of a container closure, which makes it possible to provide the container closure with a PVC-free sealing element based on polymers having a barrier effect, particularly with regard to oxygen and TCA, and which preferably may comprise an oxygen-depleting component. It is an important task of the invention to provide a polymer compound which is suitable for producing such a sealing insert.

The compound of the invention is intended to enable the production of container closures, which on the one hand satisfy the requirements of tightness and opening forces and on the other hand may contain an oxygen-depleting component, without, however, resorting to compounds of PVC or PVC containing compounds.

To achieve these and other objects, a sealing insert according to the present invention for twist crown corks is provided with the features that are defined in the independent claims. Advantageous embodiments are defined in the dependent claims.

The polymer compounds of the invention exhibit a good barrier effect against oxygen, TCA and other undesirable volatiles.

They are softer than comparable, conventional compounds, thereby improving their sealing effect. Preferably the Shore D - hardness is above 20, but not higher than 55. The Melt Flow Index of the compounds (MFI at 190° C. and 5 kg) is preferably at least 5, preferably at least 10 and particularly preferably at 13 or more. Particularly suitable compounds show an MFI of more than 15, more than 20, and sometimes even more than 25, which has a particularly favorable effect on processability.

The compounds of the invention may basically be comprised of a substance mixture which may comprise at least one, but preferably two or more different polymers, and besides, in case, conventional additives (antioxidants, lubricants, pigments and the like), wherein a content of scavenger material is optionally added to the substance mixture.

The compound preferably may comprise a non-cross linked (rubbery) barrier polymer. Polymers such as butyl rubber, polyisoprene, polyisobutylene, SIBS, or polybutene can be used for this purpose.

To establish the desired hardness (and other properties), the compound furthermore may comprise preferably thermoplastic polymers, in particular based on polyethylene. For this purpose, one or (preferably) two or more different types of polyethylene may be added. In preferred embodiments, the compound includes HDPE, (in addition to) LDPE and/or LLDPE, whereby a compound having contents of HDPE in addition to LDPE is preferred, and in some embodiments compounds are preferred which do not contain LLDPE.

The compound can instead of those mentioned above or additionally have a content of polypropylene (PP) and/or a copolymer of propylene and ethylene (co-PP).

It is in principle possible to use SIBS as a barrier polymer. According to the present invention such compounds are preferred which contain the SIBS in combination with polyolefins. In more preferred embodiments any polyolefins such as LDPE and HDPE can be used for that purpose. The relative total content of polyolefins is preferably higher than that of the SIBS. In particularly preferred embodiments, the relative content of SIBS is above 5% by weight, more preferably above 10 wt % and below 30% by weight. The relative total content of polyolefins is generally at least 30% by weight, preferably at least 50 wt % and optionally at least 70% by weight (always based on the total weight of the final compounds). Preferred SIBS based compounds have a Shore D hardness between 30 and 60, for example, between 45 and 55.

Additionally or alternatively, the compound may contain other polymers having elastomeric properties.

It is particularly preferred to add to the compound a content of ethylene vinyl acetate (EVA), and in particular that the compound has also a content of ethylene-octene block copolymer. The VA content of the EVA is preferably in the range of 1% to 30%, usually between 5% and 25%.

The compound according to the invention may comprise essentially no oil (i.e. less than 10%, more especially less than 5%), preferably no oil at all, and preferably also no other (organic) constituents being liquid at room temperature.

As a scavenger the compound according to the invention contains preferably sodium sulfite. The content of the scavenger material is generally from about 1 to 10%, based on the total weight of the compound.

Basically a compound according to the present invention may be formed only from a thermoplastic polymer having a suitable hardness (esp. HDPE) and a butyl rubber, wherein only the scavenger and conventional additives (lubricants and the like) are added to the two polymers. In preferred embodiments, such a polymer compound may be comprised of HDPE and butyl rubber, wherein the content of HDPE is higher than the one of rubber. Such compounds are (in the range of compounds according to the invention) relatively hard and inflexible; they are particularly suitable for less demanding applications, e.g. for disposable bottles.

In contrast, for more demanding purposes, in particular for re-sealable containers, compounds are preferred which are softer and have been modified so that they are more elastic. This can be achieved in that a basic mixture of hard polymer (e.g. HDPE) and butyl rubber is provided with additions of softer polymers. In this case especially (but not exclusively) ethylene-octene (block) copolymers, LDPE and EVA come into consideration, but also soft-elastic polypropylene copolymers can be used.

As already indicated such compounds can be used even without any scavenger content for seals with a barrier function against oxygen, TCA and the like.

In the container closure according to the invention the sealing member is similarly formed as an insert on the inner surface of the container closure, as it is also the case with the known bottle caps or screw caps.

While the known bottle closures (crown corks and the like) have the sealing member formed generally as a circular disk on the inside of a container closure, it may be advantageous at larger container closure such as in accordance with the invention to form only one ring of polymer material which in the closed condition rests on the container wall in the opening area of the container. Such annular sealing elements are known, but are—as mentioned above—exclusively made of PVC and materials which may comprise PVC and plasticisers, although there are also PU materials from which the above-mentioned sealing elements are made.

For this purpose, the method described in U.S. Pat. No. 5,763,004 can be used, which is incorporated by reference in the present specification.

In accordance with the manufacturing method according to the invention, one generally starts with a container closure blank of metal, which is optionally first pretreated on its inner side with a suitable primer. In a plastic container closure, such a pretreatment is not necessary.

The polymer material which is provided to form the seal is applied in a thermally flowable form on the inner side of the thus pretreated blank. In particular, an extrusion is suitable, wherein the sealing compound is placed in a temperature range between 100° C. and 260° C.

The extrusion can be carried out approximately in the middle of the blank's inner surface, when the sealing insert is intended to form a circular disc-shape. The dosage of the polymeric material for the extrusion takes place via stripping a defined amount of the polymer compounds at a nozzle.

Subsequently, the circular disc-shaped sealing element is formed from the extruded, still flowable material by corresponding stamping or punching (analogous to the known SACMI process).

In a modified form, the sealing member may be formed outside of the closure or closure blank by stamping of a suitable polymer material and then placing it in the closure or blank. This process is also known by SACMI for small caps as outshell-molding.

It is also conceivable to produce a profiled disc or an annular structure by the injection molding process, which subsequently may be inserted e.g. into a metal closure blank.

Although the present invention and its advantages have been described in detail, it should be understood that various changes, substitutions and alterations can be made herein without departing from the spirit and scope of the invention as defined in the appended claims.

The present invention will be further illustrated in the following Examples which are given for illustration purposes only and are not intended to limit the invention in any way.

EXAMPLES

Example 1

| | |
|---|---|
| Butyl rubber | 23 wt.-% |
| HDPE | 68.5 wt.-% |
| sodium sulfite | 8 wt.-% |
| Erucamide, pigment | 0.5 wt.-% |
| MFI (190° C., 5 kg) | 18 |
| Shore D-hardness | 50 |

Example 2

| | |
|---|---|
| Butyl rubber | 20 wt.-% |
| HDPE | 55 wt.-% |
| Ethylene-octene block copolymer, | 10.5 wt.-% |
| EVA (19% VA) | 6 wt.-% |
| sodium sulfite | 8 wt.-% |
| Erucamide, pigment | 0.5 wt.-% |
| MFI (190° C., 5 kg) | 25.5 |
| Shore D-hardness | 45 |

Example 3

| | |
|---|---|
| Butyl rubber | 17.5 wt.-% |
| HDPE | 54 wt.-% |
| Ethylene-octene block copolymer, | 10 wt.-% |
| EVA (14% VA) | 10 wt.-% |
| sodium sulfite | 8 wt.-% |
| Erucamide, pigment | 0.5 wt % |
| MFI (190° C., 5 kg) | 14 |
| Shore D-hardness | 44 |

Example 4

| | |
|---|---|
| Butyl rubber | 15 wt.-% |
| HDPE | 51 wt.-% |
| Ethylene-octene block copolymer, | 15 wt.-% |
| EVA (14% VA) | 10.5 wt.-% |
| sodium sulfite | 8 wt.-% |
| Erucamide, pigment | 0.5 wt.-% |
| MFI (190° C., 5 kg) | 13 |
| Shore D-hardness | 43 |

Example 5

| | |
|---|---|
| Butyl rubber | 20 wt.-% |
| HDPE | 36 wt.-% |
| Ethylene-octene block copolymer, | 15.5 wt.-% |
| LLDPE | 20 wt.-% |
| sodium sulfite | 8 wt.-% |
| Erucamide, pigment | 0.5 wt.-% |
| MFI (190° C., 5 kg) | 7.5 |
| Shore D-hardness | 40 |

Example 6

| | |
|---|---|
| Butyl rubber | 18 wt.-% |
| HDPE | 30 wt.-% |
| Ethylene-octene block copolymer, | 15.5 wt.-% |
| LLPDE | 20 wt.-% |
| EVA (14% VA) | 8 wt.-% |
| sodium sulfite | 8 wt.-% |
| Erucamide, Pigment | 0.5 wt.-% |
| MFI (190° C., 5 kg) | 6.7 |
| Shore D-hardness | 39 |

Example 7

| | |
|---|---|
| HDPE | 30 wt.-% |
| Ethylene-octene copolymer | 15.5 wt.-% |
| LDPE | 36 wt.-% |
| LLDPE | 10 wt.-% |
| sodium sulfite | 8 wt.-% |
| Erucamide, pigment | 0.5 wt.-% |
| MFI (190° C., 5 kg) | 8.8 |
| Shore D-hardness | 40 |

Example 8

| | |
|---|---|
| Butyl rubber | 25 wt % |
| HDPE 1 | 50 wt % |
| HDPE 2 | 24.5 wt % |
| Erucamide, pigment | 0.5 wt % |
| MFI (190° C., 5 kg) | 20 |
| Shore D-hardness | 50 |
| OTR | 447 |

Example 9

| | |
|---|---|
| SIBS | 25% wt % |
| HDPE 1 | 50% wt % |
| HDPE 2 | 4.5 wt % |
| erucamide, pigment | 0.5 wt % |
| MFI (190° C., 5 kg) | 18 |
| Shore D hardness | 50 |
| OTR | 437 |

Example 10

| | |
|---|---|
| SIBS | 17.5 wt % |
| HDPE 1 | 37.5 wt.-% |
| HDPE 2 | 24.5 wt % |
| LDPE | 20 wt % |
| Erucamide, pigment | 0.5 wt % |
| MFI (190° C., 5 kg) | 17 |
| Shore D hardness | 49 |
| OTR | 506 |

Example 11

| | |
|---|---|
| Butyl rubber | 23 wt % |
| HDPE 1 | 46.5 wt % |
| HDPE 2 | 22 wt % |
| $Na_2SO_3$ | 8 wt % |
| Erucamide, pigment | 0.5 wt % |
| MFI (190° C., 5 kg) | 18 |
| Shore D hardness | 50 |
| OTR | 503 |

Example 12

| | |
|---|---|
| SIBS | 23 wt % |
| HDPE 1 | 46.5 wt.-% |
| HDPE 2 | 22 wt % |
| $Na_2SO_3$ | 8 wt % |
| Erucamide, pigment | 0.5 wt % |
| MFI (190° C., 5 kg) | 16 |
| Shore D hardness | 50 |
| OTR | 494 |

Example 13

| | |
|---|---|
| SIBS | 15.5 wt % |
| HDPE 1 | 35 wt.-% |
| HDPE 2 | 22 wt.-% |
| LDPE | 19 wt % |
| $Na_2SO_3$ | 8 wt % |
| Erucamide, pigment | 0.5 wt % |
| MFI (190° C., 5 kg) | 14 |
| Shore D hardness | 49 |
| OTR | 572 |

The OTR values as indicated above ($cm^3/m^2 d$) are measured using a Mocon OX-TRAN 2/60 at 25° C., 100% relative humidity, and have been normalized to a film thickness of 100 μm.

HDPE 1 is an HDPE having an MFI=30
HDPE 2 is an HDPE having an MFI=2

Further embodiments of the invention, insofar as they relate to compounds having barrier properties per se, result from the above embodiments 2 to 7 by omitting the scavenger material (sodium sulfite).

According to the invention the polymeric materials may withstand a hot filling of up to 100° C. for up to 60 min, starting from a hot-filling of at least 60° C. in at most 10 min and at least 1 min. The hot filling, starting from 60° C., can be carried out at in 60 minutes in increments of 5° to up 100° C.

Optionally, the formulations of the compounds may contain pigments, preferably inorganic pigments, in order to exclude a pigment migration. It has also been found that other additives such as waxes, silicones and especially blowing agents may be added to the polymer compound, for example, in order to improve the processing and application properties.

The invention is further described by the following numbered paragraphs:

1. A polymer compound for a PVC-free sealing insert of a container closure, provided with at least one oxygen-depleting compound, characterized in that the polymer compound has a Shore D hardness of least 20 and a melt flow index (190° C., 5 kg) of at least 5.

2. The polymer compound according to paragraph 1, which is composed so that the compound essentially comprises a combination of (rubbery) barrier polymer such as butyl rubber, polyisoprene, polyisobutylene, SIBS, or polybutene and polyolefin, but no oil.

3. The compound according to paragraph 1 or 2, characterized in that the compound has a Shore D hardness of from 20 to 60 and particularly preferably of from 40 to 50.

4. The compound according to paragraph 1 to 3, characterized in that the compound contains sodium sulfite as an oxygen-depleting compound, preferably having a mean particle size of less than 20 microns, more preferably having a mean particle size of less than 12 microns and even more preferably a mean particle size of less than 7 microns.

5. The compound according to paragraphs 1 to 4, characterized in that the compound contains between 1% to 10% of sodium sulfite, preferably from 4% to 8% of sodium sulfite as an oxygen-depleting compound.

6. The polymer compound for a PVC-free sealing insert of container closures containing at least one polyolefin and at least one (rubbery) barrier polymer according to paragraph 2, but containing substantially no oil, wherein the polymer compound contains at least one further different polymer, which reduces the total hardness (Shore D) of the compound, as compared to a corresponding compound without the further polymer, wherein the Shore D hardness of all the compounds containing these polymers is at least 20, and the compound has a melt flow index (190° C., 5 kg) of at least 5.

7. The polymer compound according to any one of paragraphs 1 to 6, characterized in that the compound comprises up to 50%, more preferably up to 40%, more preferably up to 25% and preferably at least 10%, more preferably at least 15% and particularly preferably at least 20% of the (rubbery) polymer barrier according to paragraph 2.

8. The polymer compound according to any one of paragraphs 1 to 7, characterized in that the compound contains up to 80 wt.-%, more preferably up to 70%, particularly preferably up to 60% and preferably at least 30%, more preferably at least 40% and particularly preferably at least 50% of HDPE.

9. The compound according to paragraphs 1 to 8, characterized in that the compound contains between 5% to 25% of low density polyethylene, LDPE, preferably between 10% to 10% of LDPE.

10. The compound according to paragraphs 1 to 9, characterized in that the compound contains not more than 4% and more preferably not more than 1% of lubricants.

11. The compound according to paragraphs 1 to 10, characterized in that the compound contains not more than 10 wt.-% of oil, preferably no more than 5 wt.-% of oil, and more preferably no oil.

12. The compound according to paragraphs 1 to 11, characterized in that the compound contains up to 30% of linear low density polyethylene, LLDPE, preferably up to 10% of LLDPE and more preferably not more than 5 wt.-% of LLDPE.

13. The compound according to any one of paragraphs 1 to 12, characterized in that the compound contains at least one block copolymer, said block copolymer preferably being an interpolymer of ethylene with at least one $C_3$-$C_{10}$-alpha-olefin or a copolymer of ethylene with a $C_3$-$C_{20}$ alpha-olefin optionally in combination with other unsaturated monomers, and preferably constituting up to 25 wt.-%, more preferably up to 20 wt.-% and more preferably between 5 wt.-% and 15 wt.-% of the compound. 14. The polymer compound according to any one of paragraphs 1 to 13, characterized in that the compound has a content of EVA, constituting preferably at least 5 wt. -%, more preferably at least 8 wt.-% and more preferably at least 10 wt.-%, wherein the compound preferably also has a content of a block copolymer according to paragraph 13.

15. The compound according to any one of paragraphs 1 to 14, containing additives such as waxes and silicones.

16. A sealing insert of a container closure, comprising a polymer compound according to any one of paragraphs 1 to 15.

17. A container closure having a sealing insert, comprising a polymer compound according to any one of paragraphs 1 to 15.

18. The use of a polymer compound according to any one of paragraphs 1 to 15 for the manufacture of a sealing insert of a container closure, in particular a bottle cap or a closure cap, specifically a crown cap.

* * *

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A polymer-containing composition for a PVC-free sealing insert for a container closure which comprises a blend comprising:
   at least one polymer that has barrier properties to oxygen and volatile compounds;
   at least one oxygen depleting compound; and
   optionally at least one additive
wherein the polymer-containing composition:
   contains no more than 10% by weight of an oil;
   has a Shore D hardness of at least 20; and
   a melt flow index (190° C., 5 kg) of at least 5.

2. The polymer-containing composition according to claim 1, wherein the polymer is a non-cross linked barrier polymer and the polymer-containing composition has a Shore D hardness from 20 to 60 and a melt flow index (190° C., 5 kg) from 5 to 25.

3. The polymer-containing composition according to claim 2, wherein the non-cross linked barrier polymer is selected from the group consisting of butyl rubber, polyisoprene, polyisobutylene, styrene isoprene butadiene (SIBS), polybutene, and polyolefin.

4. The polymer-containing composition according to claim 2, wherein the non-cross linked barrier polymer is present in an amount of between 10% to 50% by weight of the polymer-containing composition.

5. The polymer-containing composition according to claim 2, wherein the oxygen depleting compound is sodium sulfite, which has a mean particle size of less than 20 microns.

6. The polymer-containing composition according to claim 5, wherein the sodium sulfite is present in an amount between 1% to 10% by weight of the polymer-containing composition.

7. The polymer-containing composition according to claim 2, which further comprises a second polymer which is a polyolefin.

8. The polymer-containing composition according to claim 7, wherein the second polymer which is high-density polyethylene (HDPE), polypropylene (PP) or a copolymer of polypropylene and ethylene (co-PP).

9. The polymer-containing composition according to claim 2, which further contains up to 80% by weight of a second polymer.

10. The polymer-containing composition according to claim 2, wherein the second polymer is high-density polyethylene (HDPE).

11. The polymer-containing composition according to claim 1, wherein the additive is a wax or silicone.

12. The polymer-containing composition according to claim 1, which contains no more than 4% by weight of the polymer-containing composition of an additive which is a lubricant.

13. The polymer-containing composition according to claim 1, which contains no more than 5% by weight of the polymer-containing composition of an oil.

14. The polymer-containing composition according to claim 1, which contains no oil.

15. The polymer-containing composition according to claim 7, which further comprises at least one softer polymer, which reduces the total hardness (Shore D) of the polymer-containing composition, as compared to a corresponding polymer-containing composition that does not contain the at least one softer polymer.

16. The polymer-containing composition according to claim 15, the softer polymer is a low density polyethylene (LDPE), which is present in an amount between 5% to 25% by weight of the polymer-containing composition, or linear low density polyethylene (LLDPE), which is present in an amount of up to 30% by weight of the polymer-containing composition.

17. The polymer-containing composition according to claim 15, wherein the softer polymer is a block copolymer, which is present in an amount of up to 25% by weight of the polymer-containing composition.

18. The polymer-containing composition according to claim 17, wherein the block copolymer is an interpolymer of ethylene with at least one $C_3$-$C_{10}$-alpha-olefin or a copolymer of ethylene with a $C_3$-$C_{20}$ alpha-olefin optionally in combination with other unsaturated monomers.

19. The polymer-containing composition according to claim 15, wherein the softer polymer is EVA, which is present in an amount of at least 5% by weight of the polymer-containing composition.

20. The polymer-containing composition according to claim 19, which further comprises a block copolymer, which is present in an amount of up to 25% by weight of the polymer-containing composition.

21. The polymer-containing composition according to claim 1, wherein the polymer is a polyolefin and the polymer-containing composition has a Shore D hardness from 20 to 60 and a melt flow index (190° C., 5 kg) from 5 to 55.

22. The polymer-containing composition according to claim 1, wherein the polyolefin is high-density polyethylene (HDPE), polypropylene (PP) or a copolymer of polypropylene and ethylene (co-PP).

23. The polymer-containing composition according to claim 22, which further comprises at least one softer polymer, which reduces the total hardness (Shore D) of the polymer-containing composition, as compared to a corresponding polymer-containing composition that does not contain the at least one softer polymer.

24. The polymer-containing composition according to claim 23, the softer polymer is a low density polyethylene (LDPE), which is present in an amount between 5% to 25% by weight of the polymer-containing composition, or linear low density polyethylene (LLDPE), which is present in an amount of up to 30% by weight of the polymer-containing composition.

25. The polymer-containing composition according to claim 23, wherein the softer polymer is a block copolymer, which is present in an amount of up to 25% by weight of the polymer-containing composition.

26. The polymer-containing composition according to claim 25, wherein the block copolymer is an interpolymer of ethylene with at least one $C_3$-$C_{10}$-alpha-olefin or a copolymer of ethylene with a $C_3$-$C_{20}$ alpha-olefin optionally in combination with other unsaturated monomers.

27. The polymer-containing composition according to claim 23, wherein the softer polymer is EVA, which is present in an amount of at least 5% by weight of the polymer-containing composition.

28. The polymer-containing composition according to claim 27, which further comprises a block copolymer, which is present in an amount of up to 25% by weight of the polymer-containing composition.

29. A sealing insert of a container closure, comprising the polymer-containing composition according to claim 1.

30. The sealing insert according to claim 29, which is for a bottle cap or a closure cap.

31. A container closure having a sealing insert comprising the polymer-containing composition according to claim 1.

* * * * *